United States Patent [19]

Nishigai et al.

[11] Patent Number: 5,626,057
[45] Date of Patent: May 6, 1997

[54] CHANGE LEVER SUPPORTING STRUCTURE

[75] Inventors: Yukio Nishigai; Shigeo Matsumoto; Takatoshi Harada, all of Shizuoka, Japan

[73] Assignee: Kabushiki Kaisha Atsumitec, Shizuoka, Japan

[21] Appl. No.: 456,377

[22] Filed: Jun. 1, 1995

[30] Foreign Application Priority Data

Dec. 28, 1994 [JP] Japan .................................. 6-328189
Jan. 9, 1995 [JP] Japan .................................. 7-001369

[51] Int. Cl.$^6$ .................................................. F16H 59/04
[52] U.S. Cl. .................................. 74/473 P; 403/130
[58] Field of Search .......................... 74/473 P; 403/122, 403/128, 130

[56] References Cited

U.S. PATENT DOCUMENTS 2,638,850  5/1953  Ferris ........................... 403/128 X
4,693,135  9/1987  LaRocca et al. ............... 74/473 P X
4,986,688  1/1991  Tuan et al. .................... 403/128 X
5,265,495  11/1993 Bung et al. .................... 74/502.6

FOREIGN PATENT DOCUMENTS 5-240329  9/1993  Japan .

*Primary Examiner*—Charles A. Marmor
*Assistant Examiner*—David M. Fenstermacher
*Attorney, Agent, or Firm*—Nikaido, Marmelstein, Murray & Oram LLP

[57] ABSTRACT

Main and subsidiary levers 24 and 25 forming a change lever are intersected and coupled to each other to form a T-shape. A pair of hemispherical bodies forming a fulcrum member are formed, at their coupled end surfaces, with supporting recesses extended in three directions and fitted to outer peripheral surfaces of the intersected main and subsidiary levers. With this arrangement, it is possible to reliably and easily mount the spherical fulcrum member to the change lever.

6 Claims, 7 Drawing Sheets

CHANGE LEVER SUPPORTING STRUCTURE

BACKGROUND OF THE INVENTION

1. Field of the Invention

The present invention relates to a change lever supporting structure in a change device for controlling a transmission of a motor vehicle, and more particularly, to an improvement of a change lever supporting structure, comprising a change lever including a main lever having a knob, and a subsidiary lever projected from one side of a lower end portion in the main lever; and a spherical fulcrum member having a center at an intersection between axes of both the main and subsidiary levers and attached to the change lever; the fulcrum member being supported on a housing of a lever bracket for swinging movement in a select direction and a shift direction of the change lever.

2. Description of the Prior Art

There is a structure for securing a spherical fulcrum member to a change lever as disclosed, for example, in Japanese Patent Application Laid-open No. 240329/93. In the known structure, the fulcrum member is formed of a pair of hemispherical bodies, and the spherical bodies are joined with each other so as to sandwich the change lever.

In the known structure, both the hemispherical bodies are mounted to a straight portion of the change lever. Therefore, in order to restrain a relative displacement between both the hemispherical bodies and the change lever in their axial directions and rotational directions, a straight portion of the change lever is subjected to a plastic working or cutting process so as to form a sectional shape different from that of the hemispherical bodies. However, such a plastic working or cutting process becomes a barrier for a low manufacturing cost.

SUMMARY OF THE INVENTION

Accordingly, it is an object of the present invention to provide a supporting structure of the change lever in which a fulcrum member including a pair of hemispherical bodies can easily and reliably be secured to the change lever.

To achieve the above object, according to a first feature of the present invention there is provided a change lever supporting structure, comprising: a change lever including a main lever having a knob, and a subsidiary lever projected from one side of a lower end portion of the main lever; and a spherical fulcrum member having a center at an intersection between axes of both the main and subsidiary levers and attached to the change lever; the fulcrum member being supported on a housing of a lever bracket for swinging movement in a select direction and a shift direction of the change lever, wherein the main and subsidiary levers are intersected and coupled together such as to form a T-shape, the fulcrum member is formed by coupling a pair of hemispherical bodies, and the hemispherical bodies are formed at their coupled end surfaces with semi-cylindrical supporting recesses extending in three directions so as to be fitted around outer peripheral surfaces of the main and subsidiary levers.

With the first feature, the hemispherical bodies forming the fulcrum member are supported, at their supporting recesses extended in three directions, by the change lever. Therefore, whenever the change lever is operated, the hemispherical bodies are always rotated together with the change lever and thus, no relative displacement between them is generated. Thus, it is possible to reliably and easily secure the hemispherical bodies to the change lever by using the main and subsidiary levers, and a friction loss due to a relative displacement and a backlash are avoided. This arrangement eliminates a need for conducting a special working to the change lever, leading to a reduction in manufacturing cost.

In addition to the first feature, according to a second feature, each of the hemispherical bodies is a molded article formed of synthetic resin, and is provided at an outer periphery of an end portion thereof with an annular chamfer formed during molding.

With the second feature, when each of the hemispherical bodies is formed, mating surfaces of a binary mold are placed in alignment with the end of the hemispherical body. Therefore, a burr which may be produced between the mating surfaces of the mold is kept in a range defined by the outer hemispherical surface of the molded body and thus, it is possible to omit a process for removing such burr.

In addition to the first or second feature, according to a third feature, said fulcrum member comprising said hemispherical bodies is formed of a hollow shape, and grease is filled in the hollow fulcrum member, and said fulcrum member is provided with a grease hole for exuding the grease to the outer periphery of the fulcrum member.

With this feature, grease within the fulcrum member is exuded through the grease hole so that the grease can automatically be supplied to the sliding surface between the fulcrum member and the housing. Therefore, it is possible to eliminate the grease supplementing operation.

Further, in addition to the third feature, it is a fourth feature that the fulcrum member is formed at an outer peripheral surface thereof with a grease sump to which the grease hole is opened.

With the fourth feature, it is possible to keep the excellent lubrication state around the fulcrum member by holding the grease exuded from the grease hole in the grease sump.

The above and other objects, features and advantages of the invention will become apparent from preferred embodiments taken in conjunction with the accompnying drawings.

DESCRIPTION OF THE PREFERRED EMBODIMENTS

The present invention will now be described by way of preferred embodiments taken in conjunction with the accompanying drawings.

Figure 1:
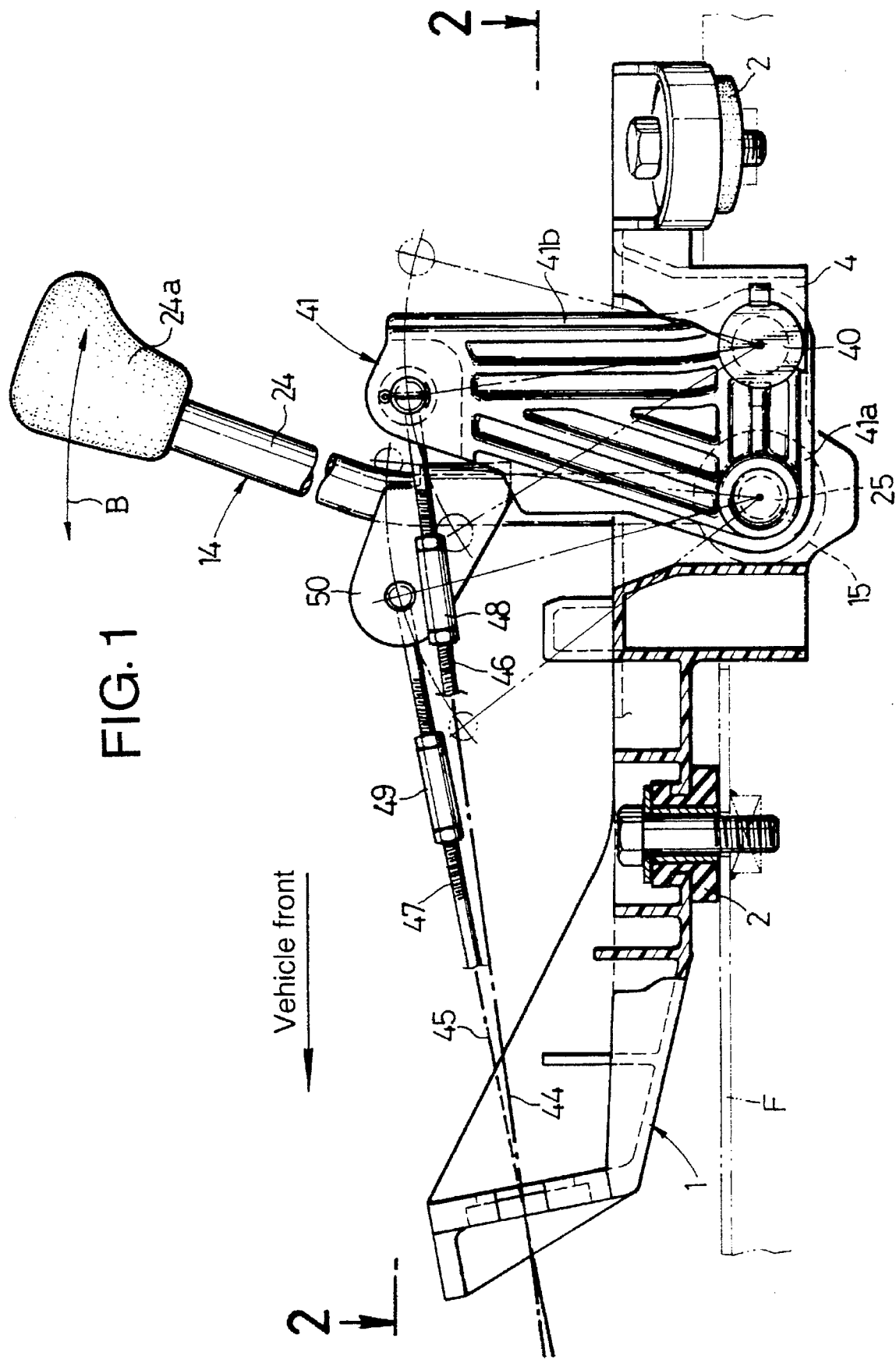
FIG. 1 is a side view of a change lever supporting structure according to a first embodiment of the present invention, partly in longitudinal section.
Figure 2:
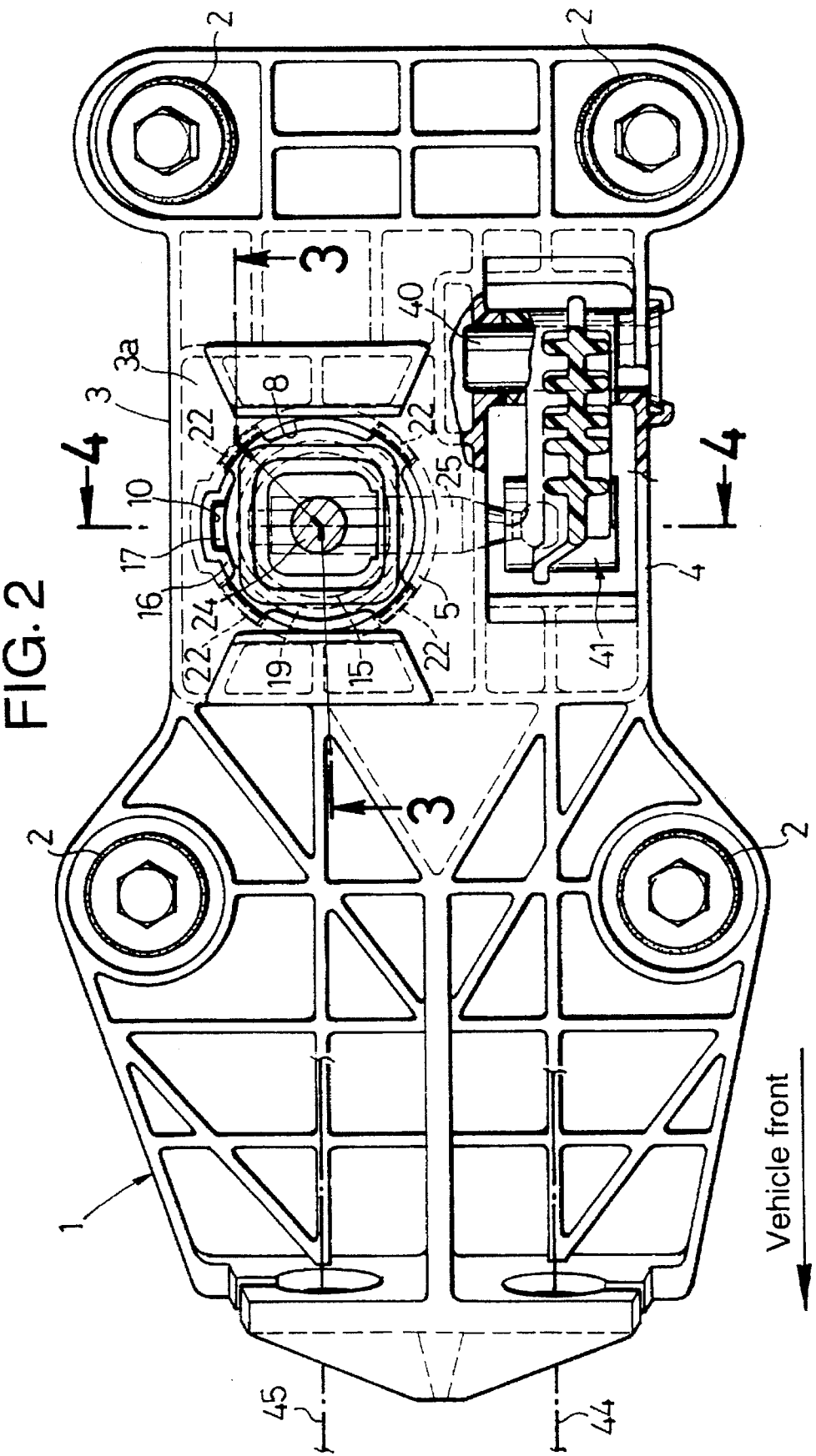
FIG. 2 is a sectional view taken along a line 2—2 in FIG. 1.
Figure 3:
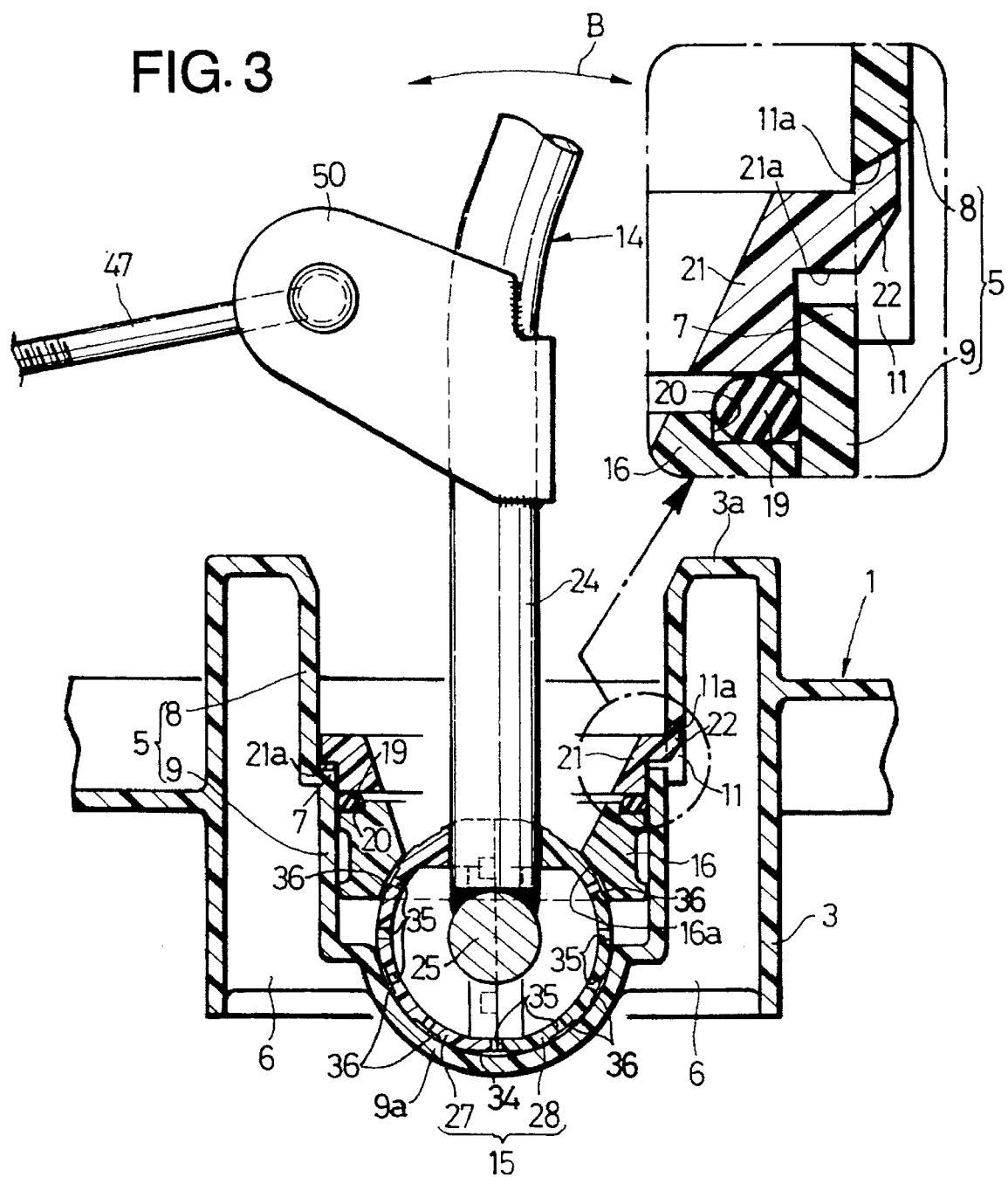
FIG. 3 is an enlarged longitudinal sectional view taken along line 3—3 in FIG. 2.
Figure 4:
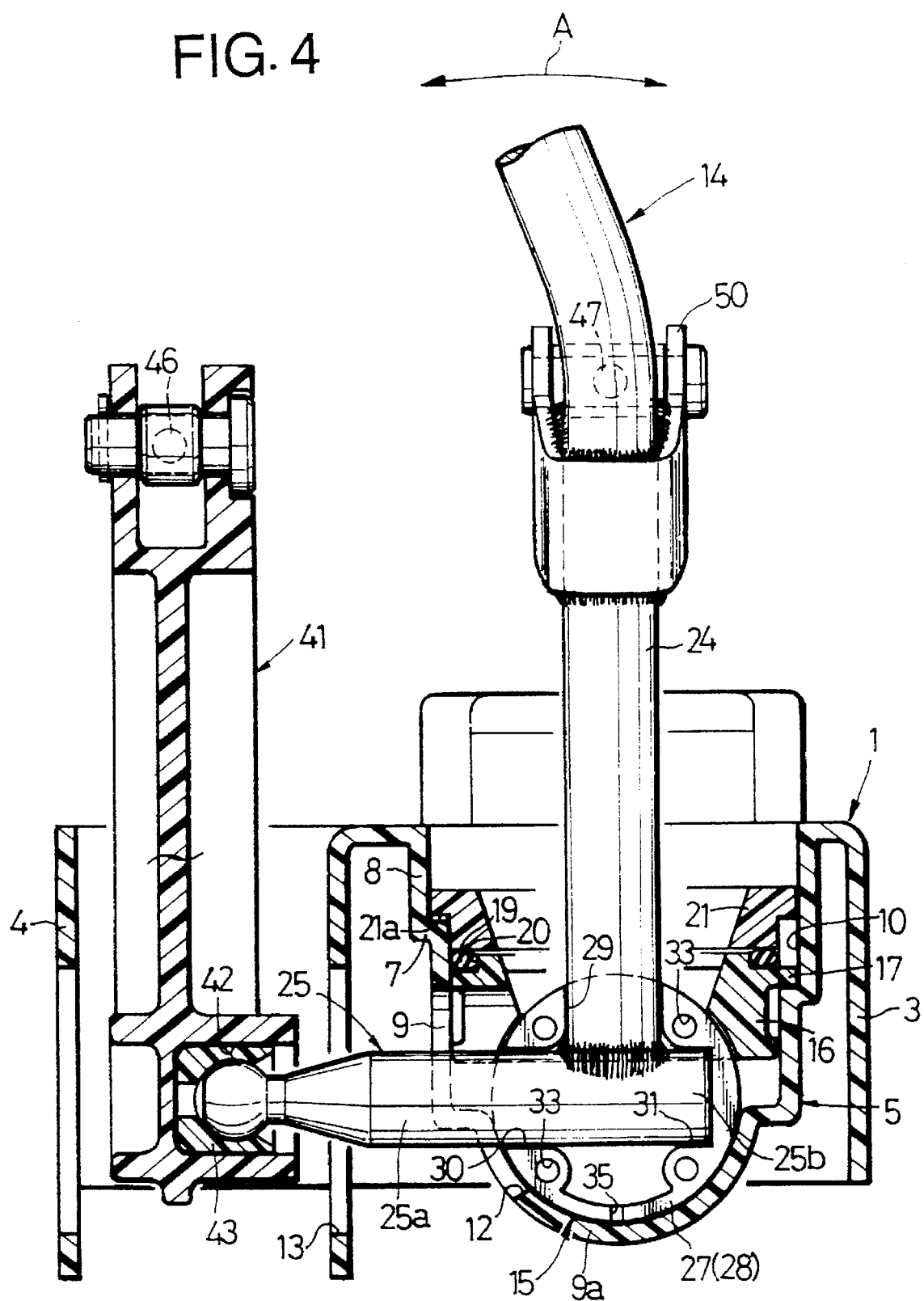
FIGS. 4 is an enlarged longitudinal sectional view taken along a; line 4—4 in FIG. 2.

First, referring to FIGS. 1 to 4, a lever bracket 1 made of resin is mounted on a floor board F of a motor vehicle through a mount rubber members 2. The lever bracket 1 is integrally provided with first and second towers 3 and 4 which are juxtaposed in a lateral direction of the motor vehicle and which commonly include a partition wall (FIGS. 2 and 4). The first tower 3 is substantially of square in section, and is opened at its lower surface. The second tower 4 is rectangular which is long in a longitudinal direction of the motor vehicle and opened at its upper and lower ends.

As can be seen from FIGS. 3 and 4, the first tower 3 is integrally and continuously formed with a housing 5 which is suspended downward from an upper end wall 3a of the first tower 3 along an axis of the tower 3. Opposed peripheral surfaces of the housing 5 and the first tower 3 are connected by a plurality of radial reinforcing ribs 6.

The housing 5 includes an upper large-diameter cylindrical portion 8 and a lower small-diameter cylindrical portion 9 which are provided so as to sandwitch a step portion 7 therebetween at an intermediate portion of the housing 5. The small-diameter cylindrical portion 9 includes a hemispherical bottom wall 9a. The small-diameter cylindrical portion 9 is formed in an inner surface thereof with a guide groove 10 which extends vertically. (see FIGS.2 and 4).

A plurality of engagement holes 11 are formed in the large-diameter cylindrical portion 8 so as to face the step portion 7. Vertically slotted holes 12 and 13 are formed in opposed side walls of the small-diameter cylindrical portion 9 and the second tower 4.

A spherical fulcrum member 15 of the change lever 14 is rotatably engaged with the hemispherical bottom wall 9a of the small-diameter cylindrical portion 9. A cap 16 made of resin is relatively rotatably engaged with the fulcrum member 15 from above and is fitted to an inner peripheral surface of the small-diameter cylindrical portion 9. At that time, a rotation-proof projection 17 (FIGS.2 and 5) projected from one side surface of the cap 16 is engaged with the guide groove 10. A surface 16a of the cap 16 which is in contact with an outer peripheral surface of the fulcrum member 15 is formed into a spherical surface so as to receive the outer peripheral surface.

The cap 16 is formed at its outer periphery of the upper end thereof with an annular recess 20 for holding an elastic ring 19 such as an O-ring. A substantially upper half of the ring 19 is exposed, in its free state, from an upper surface of the cap 16. An annular retainer 21 (FIG. 5) made of resin for compressing the elastic ring 19 from above so as to press and hold the cap 16 is fitted to inner peripheral surfaces of the large- and small-diameter cylindrical portions 8 and 9. A plurality of elastic engagement claws 22 projected from an outer periphery of the retainer 21 are engaged with the engagement holes 11.

As can be seen from FIG. 3, a tip end of the engagement claw 22 is inclined upward. When the retainer 21 is to be fitted to the large-diameter cylindrical portion 8, the engagement claw 22 is deflected inward by an inner surface of the large-diameter cylindrical portion 8, and when the engagement claw 22 reaches a position corresponding to the engagement hole 11, the engagement claw 22 engages the engagement hole 11 by its own resilient force.

An upper surface 11a of the engagement hole 11 is also inclined upward in a radially outward direction. Therefore, if the engagement claw 22 engaging the engagement hole 11 receives an upward repulsion force, the engaging force between the engagement claw 22 and the engagement hole 11 can further be enhanced. The retainer 21 is provided with a step portion 21a which is opposed to the step portion 7 of the housing 5, so that when the retainer 21 is fitted to the housing 5, the compression deformation of the elastic ring 19 by abutment between both the step portions 7 and 21a can be restrained.

In this manner, the fulcrum member 15 is rotatably interposed between the cap 16 and the bottom wall 9a of the housing 5 with a repulsion force of the elastic ring 19.

As can be seen from FIGS.1 and 4, the change lever 14 includes a bar-like main lever 24 provided at its upper end with a knob 24a, and a bar-like subsidiary lever 25 welded to a lower end of the main lever 24 so as to form a T-shape. The subsidiary lever 25 includes long and short rod portions 25a and 25b. The long rod portion 25 largely projects from one side of the main lever 24 to pass through the slotted holes 12 and 13 and extends into the second tower 4. The short rod portion 25b slightly projects from the other side of the main lever 24. The fulcrum member 15 is secured to a junction between the main and the subsidiary levers 24 and 25 so as to cover the junction.

Figure 5:
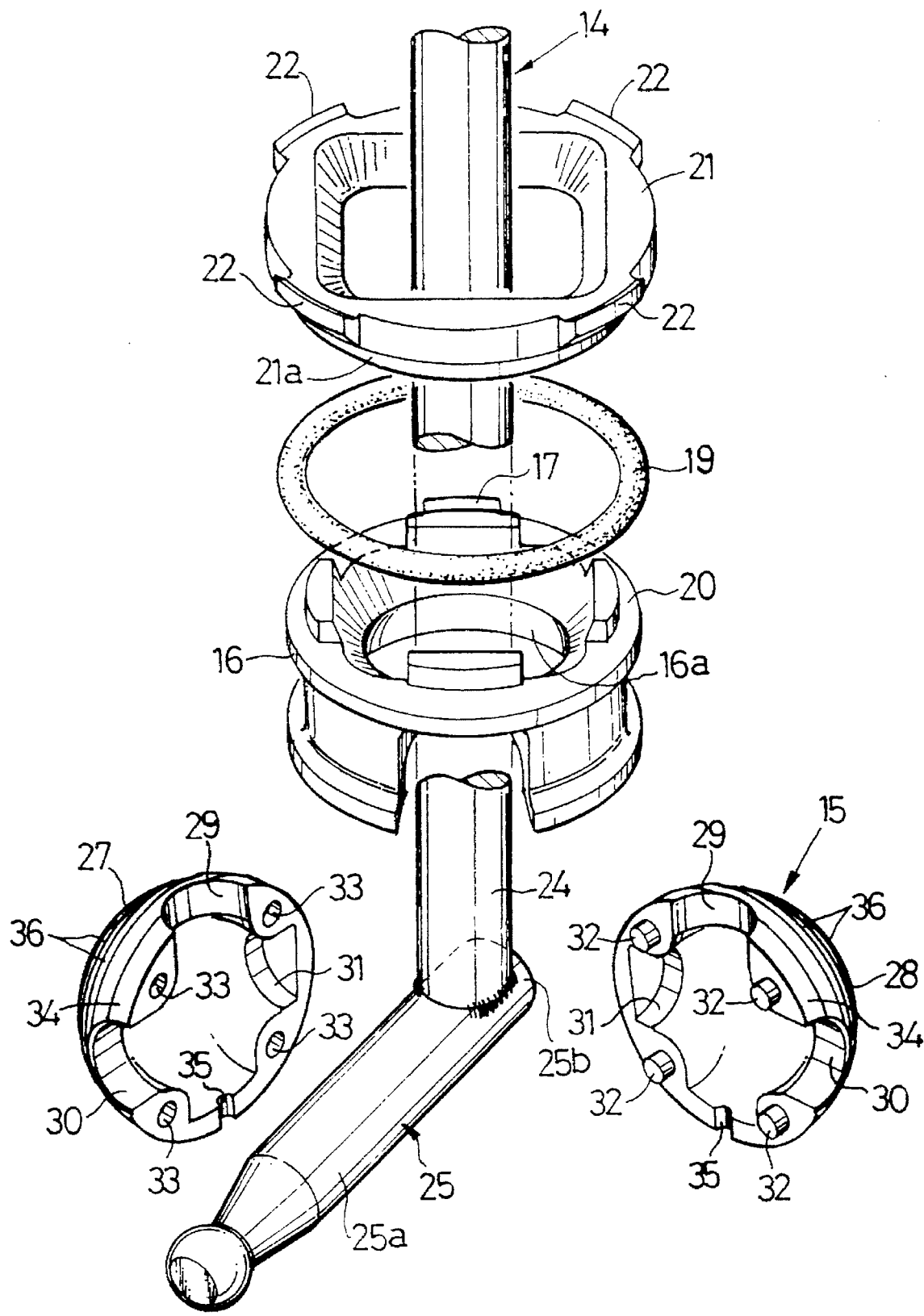
FIG. 5 is an exploded perspective view of an essential portion of the change lever supporting structure.
Figure 6:
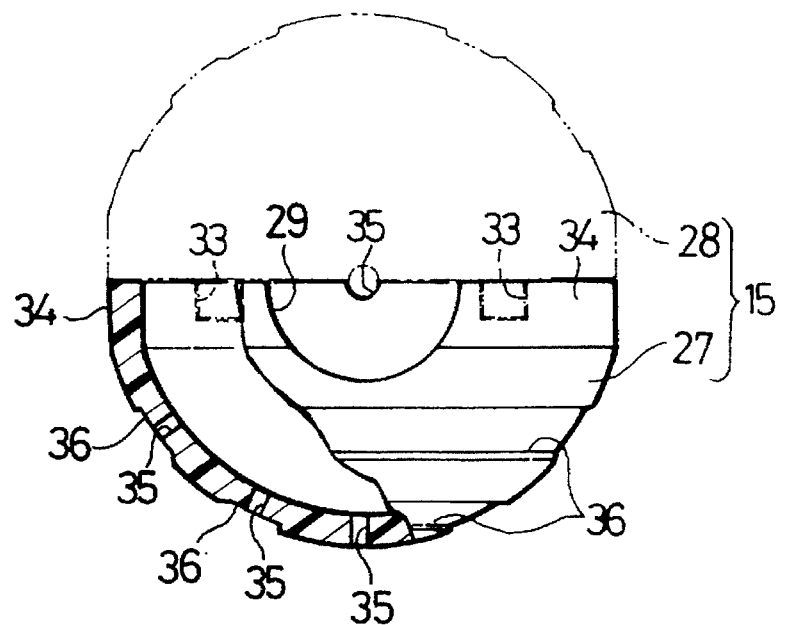
FIG. 6 is a bottom view of the fulcrum member in the change device, partly broken.

As can be seen from FIGS.4 to 6, the fulcrum member 15 is formed into a hollow structure by coupling a pair of cup-like hemispherical bodies 27 and 28 made of resin. The hemispherical bodies 27 and 28 have basically symmetrical shapes with respect to a mating surface therebetween. Each of the hemispherical bodies 27 and 28 is formed at an end surface thereof with supporting recesses 29, 30 and 31 extending in three directions. These supporting recesses 29, 30 and 31 are fitted to outer peripheries of the main lever 24, as well as the long and short rod portions 25a and 25b of the subsidiary lever 25. At that time, centers of both the hemispherical bodies 27 and 28 agree with a junction of axes of the main and subsidiary levers 24 and 25.

A plurality of positioning holes 33 are formed at the end surface of the hemispherical body 27, and a plurality of positioning projections 32 are formed at the end surface of the hemispherical body 28. By lightly fitting the positioning projections 32 into the positioning holes 33, both the hemispherical bodies 27 and 28 can temporarily be coupled.

The coupling state between the hemispherical bodies 27 and 28 is reliably retained by sandwiching them between the cap 16 and the bottom wall 9a of the housing 5, as described above.

Grease is previously filled in each of the hemispherical bodies 27 and 28. The hemispherical bodies 27 and 28 are formed at their lower mating surfaces and other appropriate portions with grease holes 35 for exuding the grease to the outer peripheries of the fulcrum member 15. The hemispherical bodies 27 and 28 are also formed at outer peripheries thereof with a plurality of annular grease sumps 36 to which many of the grease holes 35 are opened.

Figure 7:
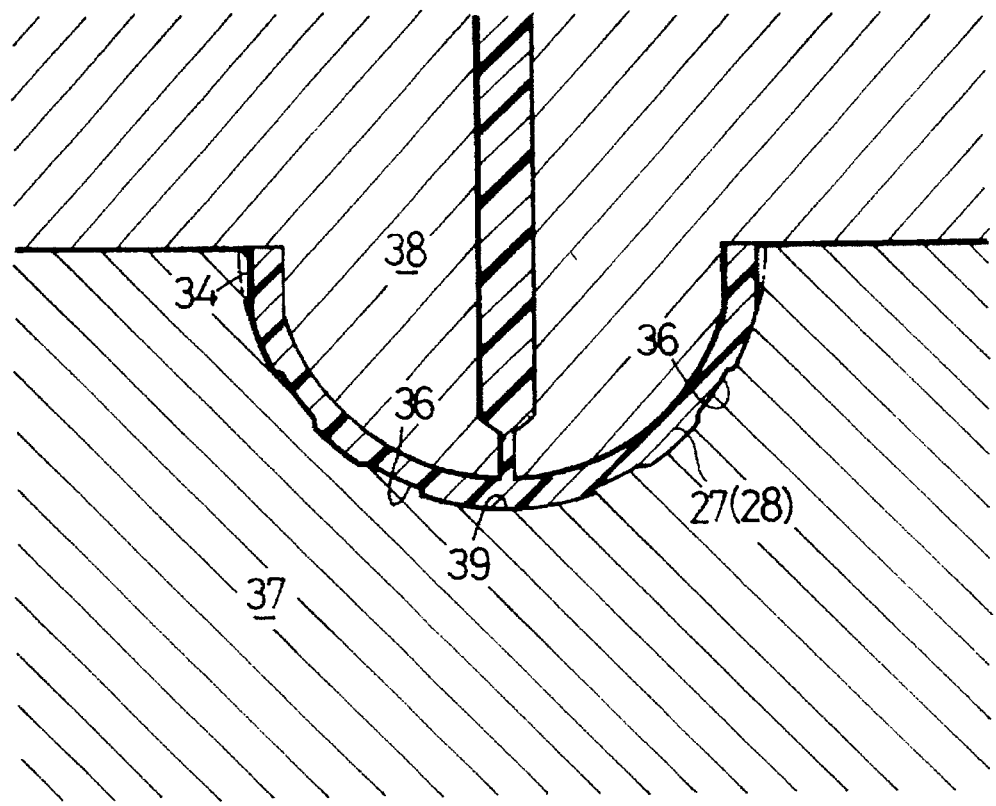
FIG. 7 is a view for explaining a moulding procedure of the hemispherical bodies forming the fulcrum member.

Further, the hemispherical bodies 27 and 28 are formed at outer peripheries of the end portions thereof with chamfers 34 which are to be formed during molding. Therefore, when the hemispherical bodies 27 and 28 are to be formed by a pair of metal dies 37 and 38 as shown in FIG. 7, if juncture surfaces of both the metal dies 37 and 38 are placed in alignment or flush with the end surface of each of the hemispherical bodies 27 and 28, it is possible to prevent a burr, which protrudes from the product molding cavity 39, such as to infiltrate into a clearance between the juncture surfaces of the metal dies 37 and 38, from remaining as a projection projecting outward on the outer spherical surfaces of the hemispherical bodies 27 and 28. Therefore, even if the hemispherical bodies 27 and 28 are assembled into the housing 5 with a burr left thereon, it is possible to prevent the burr from injuring mating members.

As is shown in FIGS.1, 2 and 4, a bell-crank 41 made of resin is mounted to the second tower 4 through a horizontal pivot shaft 40. The bell-crank 41 includes a horizontal arm 41a having a swinging end extended forward, and a vertical arm 41b having a swinging end extended upward. A bush 43 turnably mounted to a tip end of the subsidiary lever 25 is slidably fitted to a connection hole 42 formed in the inner surface of the horizontal arm 41a. One end of a push-pull select wire 44 is connected to the vertical arm 41b through a rod 46 having a turnbuckle 48.

As is shown in FIGS.1 and 3, one end of a push-pull shift wire 45 is connected to a connection piece 50 connected to an intermediate portion of the main lever 24 through a rod 47 having a turnbuckle 49.

The other ends of the select wire 44 and the shift wire 45 are respectively connected to a select member and a shift member of a transmission (not shown).

The operation of this embodiment will be described below.

If an operator grasps the knob 24a and moves the main lever 24 in a select direction A (in a lateral direction of the vehicle as shown in FIG. 4) about the fulcrum member 15, the vertically swingable subsidiary lever 25 drives the horizontal arm 41a of the bell-crank 41 so as to swing the vertical arm 41b in a longitudinal direction of the motor vehicle. Therefore, a select motion is applied to the transmission through the select wire 44, and a desired gear train is selected. Then, if the operator turns the main lever 24 about the fulcrum member 15 in a shift direction B (in a longitudinal direction of the vehicle), a shift motion is applied to the transmission through the shift wire 45, thereby establishing the previously selected gear train.

Because the pair of the hemispherical bodies 27 and 28 forming the fulcrum member 15 are formed with three supporting recesses 29, 30 and 31 in which the main and subsidiary levers 24 and 25 intersect each other to form a T-shape. Therefore, it is possible to easily and reliably prevent a relative displacement between the change lever 14 and the fulcrum member 15 in the axial and rotational directions. Therefore, when the change lever 14 is operated, a rotational sliding movement between the contacting surfaces of the housing 5, the cap 16 and the fulcrum member 15 which is lubricated with the grease is smoothly generated.

Especially, grease which is exuded from the fulcrum member 15 through the grease holes 35 is supplied to the contacting surfaces, an excellent lubricating condition is always maintained. Further, most of the grease holes 35 are opened to the grease sump 36, grease exuded from the grease sump 36 is retained and thus, an excellent lubricating condition can be kept for a long time. Also, the grease hole 35 provided in mating surfaces of the hemispherical bodies 27 and 28 is opened to the chamfers 34 formed at the outer peripheries of the end portions of the hemispherical bodies 27 and 28. Therefore, the chamfers 34 can also retain the exuded grease like the grease sump 36. Therefore, the chamfers 34 also correspond to the grease sump of the present invention.

The cap 16 and the bottom wall 9a of the housing 5 cooperatively sandwiches the fulcrum member 15 there between with a repulsion force, a frictional wear generated therebetween can automatically be compensated to prevent a backlash from being generated. Further, when the elastic ring 19 is fitted into the housing 5, the elastic ring 19 permits an engagement between the engagement claw 22 and the engagement hole 11 and holds such engagement state without generating a backlash. Therefore, an attachment member for the retainer 21 becomes unnecessary, which enhances an assembling property and simplifies the structure.

Further, the tip end of the engagement claw 22 of the retainer 21 is inclined upward, and the upper surface 11a of the engagement hole 11 of the housing 5 is also inclined upward in a outward direction. Therefore, if the retainer 21 receives an upward load from the side of the cap 16, the engagement claw 22 further strengthens its engagement with the engagement hole 11, which reliably prevents the retainer 21 from being disengaged from the housing 5.

Figure 8:
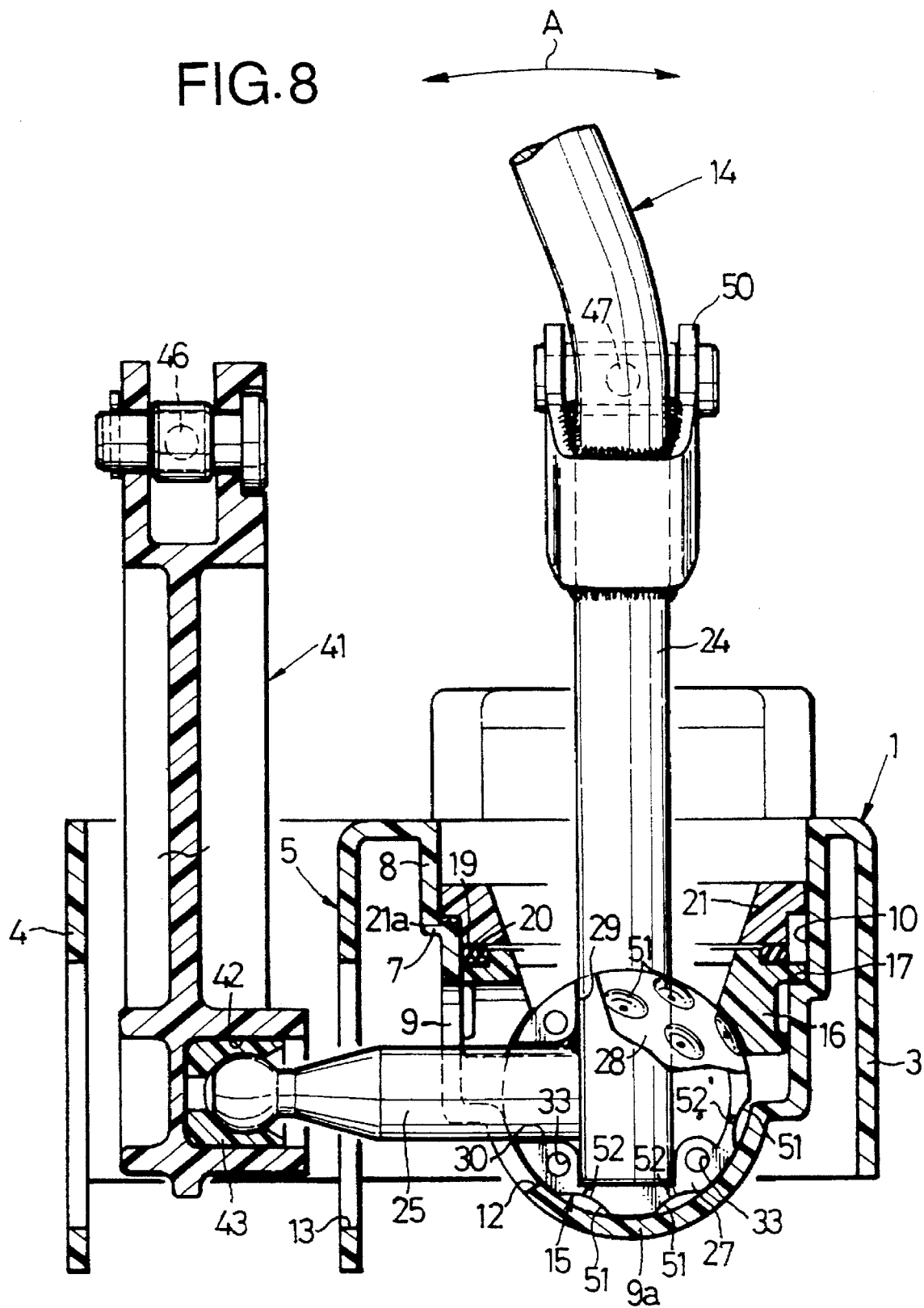
FIG. 8 is a sectional view similar to FIG. 4 but illustrating a second embodiment of the invention.

FIG. 8 shows a second embodiment of the present invention. In the second embodiment, the subsidiary lever 25 intersects one side surface of the main lever 24 such as to form a T-shape, the hemispherical bodies 27 and 28 are provided at outer peripheral surfaces thereof with a large number of dimples 51 as grease sumps, and each of the hemispherical bodies 27 and 28 is also provided with a grease hole 52 which is opened at a bottom surface of each the dimple 51. Other structures of the second embodiment are the same as those of the above-described first embodiment. In FIG. 8, portions or components corresponding to those in the first embodiment are designated by like reference characters.

According to the second embodiment, lubrication around the fulcrum member 15 can be conducted more effectively.

Although the embodiments of the present invention have been described in detail, it will be understood that the present invention is not limited to the above-described embodiments, and various modifications in design may be made without departing from the spirit and scope of the invention defined in the attached claims. For example, the hemispherical bodies 27 and 28 may be formed of steel plate press members or aluminum die cast members.

What is claimed is:

1. A change lever supporting structure, comprising:
    a change lever including a main lever having a knob, and a subsidiary lever projected from one side of a lower end portion of said main lever; and
    a spherical fulcrum member having a center at an intersection between axes of both said main and subsidiary levers and attached to said change lever; said fulcrum member being supported on a housing of a lever bracket for swinging movement in a select direction and a shift direction of said change lever,
    wherein said main and subsidiary levers are intersected integrally coupled so as to form a T-shape, said fulcrum member is formed by coupling a pair of hemispherical bodies, and said hemispherical bodies are formed at their coupled end surfaces with semi-cylindrical supporting recesses extending in three directions so as to be fitted around outer peripheral surfaces of said main and subsidiary levers wherein each of said hemispherical bodies is formed of synthetic resin by molding, and is provided at an outer periphery of an end portion thereof with an annular chamfer formed during molding.

2. A change lever supporting structure according to claim 1, wherein said fulcrum member is formed of a hollow shape, and grease is filled in the hollow fulcrum member, and said fulcrum member is provided with a grease hole for exuding the grease to the outer periphery of the fulcrum member.

3. A change lever supporting structure according to claim 2, wherein the fulcrum member is formed at an outer peripheral surface thereof with a grease sump to which said grease hole is opened.

4. A change lever supporting structure according to any one of claims 1, further comprising: a shift wire connected to said main lever and operated by swinging movement of said main lever for operating a shift member of a transmission; a bell-crank pivotally supported on said lever bracket and connected to said subsidiary lever such that said bell-crank is swung in a direction different from that of said subsidiary lever by swinging movement of said subsidiary lever caused by a swinging movement of said main lever in a select direction; and a select wire connected to said bell-crank and operated by a swinging movement thereof for operating a select member of said transmission.

5. A change lever supporting structure according to claim 2, further comprising: a shift wire connected to said main lever and operated by swinging movement of said main lever for operating a shift member of a transmission; a bell-crank pivotally supported on the lever bracket and connected to said subsidiary lever such that said bell-crank is swung in a direction different from that of said subsidiary lever by swinging movement of said subsidiary lever caused by a swinging movement of said main lever in a select direction; and a select wire connected to said bell-crank and operated by a swinging movement thereof for operating a select member of said transmission.

6. A change lever supporting structure according to claim 3, further comprising: a shift wire connected to said main lever and operated by swinging movement of said main lever for operating a shift member of a transmission; a bell-crank pivotally supported on the lever bracket and connected to said subsidiary lever such that said bell-crank is swung in a direction different from that of said subsidiary lever by swinging movement of said subsidiary lever caused by a swinging movement of said main lever in a select direction; and a select wire connected to said bell-crank and operated by a swinging movement thereof for operating a select member of said transmission.

* * * * *